(12) United States Patent
Saban et al.

(10) Patent No.: US 6,223,417 B1
(45) Date of Patent: May 1, 2001

(54) METHOD FOR FORMING MOTOR WITH ROTOR AND STATOR CORE PAIRED INTERLOCKS

(75) Inventors: Daniel M. Saban; James J. Holich, both of Fort Wayne; Harold C. Kingrey, Huntington; Michael A. Cook, Silver Lake; Peter J. Klug, Fort Wayne; Robert Sirois, Fort Wayne; Vijay P. Chahar, Fort Wayne, all of IN (US)

(73) Assignee: General Electric Corporation, Schenectady, NY (US)

( * ) Notice: Subject to any disclaimer, the term of this patent is extended or adjusted under 35 U.S.C. 154(b) by 0 days.

(21) Appl. No.: 09/220,257

(22) Filed: Dec. 23, 1998

Related U.S. Application Data

(62) Division of application No. 08/914,100, filed on Aug. 19, 1998, now Pat. No. 5,894,182.

(51) Int. Cl.$^7$ ................................................... H02K 15/02
(52) U.S. Cl. ................................ 29/598; 29/596; 29/609; 310/42
(58) Field of Search ........................... 29/598, 596, 609; 310/42, 216, 217

(56) References Cited

U.S. PATENT DOCUMENTS

| | | |
|---|---|---|
| 3,110,831 | 11/1963 | Zimmerle . |
| 3,203,077 | 8/1965 | Zimmerle . |
| 3,590,208 | 6/1971 | Martini . |
| 4,110,895 | 9/1978 | Mitsui . |
| 4,160,182 | 7/1979 | Mitsui . |
| 4,272,579 | 6/1981 | Mitsui . |
| 4,524,507 | 6/1985 | Hara et al. . |
| 4,619,028 | 10/1986 | Neuenschwander . |
| 4,738,020 | 4/1988 | Neuenschwander . |
| 5,123,155 | 6/1992 | Neuenschwander . |
| 5,142,178 | 8/1992 | Kloster et al. . |
| 5,338,996 | 8/1994 | Yamamoto . |
| 5,349,740 | 9/1994 | Neuenschwander . |
| 5,349,741 | 9/1994 | Neuenschwander . |
| 5,359,763 | 11/1994 | Neuenschwander . |
| 5,373,622 | 12/1994 | Neuenschwander . |
| 5,377,115 | 12/1994 | Neuenschwander . |
| 5,649,349 | 7/1997 | Greenway . |

*Primary Examiner*—Carl E. Hall
(74) *Attorney, Agent, or Firm*—Welsh & Katz, Ltd.; Carl B. Horton, Esq.; Wayne O. Traynham, Esq.

(57) ABSTRACT

A method for making a core for one of a rotor and a stator for use in an electric motor, the core being formed from a plurality of laminations, includes forming a predetermined number of through-material slots in a first portion of a material stock, forming at least one angled interlocking projection in the material stock, the projection having a circumferential length and being formed so that at least a portion of the projection remains integral with the material stock, cutting the material stock to define a receiving opening corresponding to the interlocking projection, the receiving opening positioned relative to the projection at an angle $\phi$ that is a whole number multiple of $\beta$, where $\beta$ is an angle defined as a ratio of 360 degrees to the number of slots and cutting the material stock to form a first substantially circular lamination. Second and third laminations are formed in kind. The second lamination is rotated relative to the first lamination and positioned on the first lamination such that the projection from the first lamination engages the receiving opening in the second lamination. The third lamination is positioned on and rotated relative to the second lamination in kind to form the core.

9 Claims, 5 Drawing Sheets

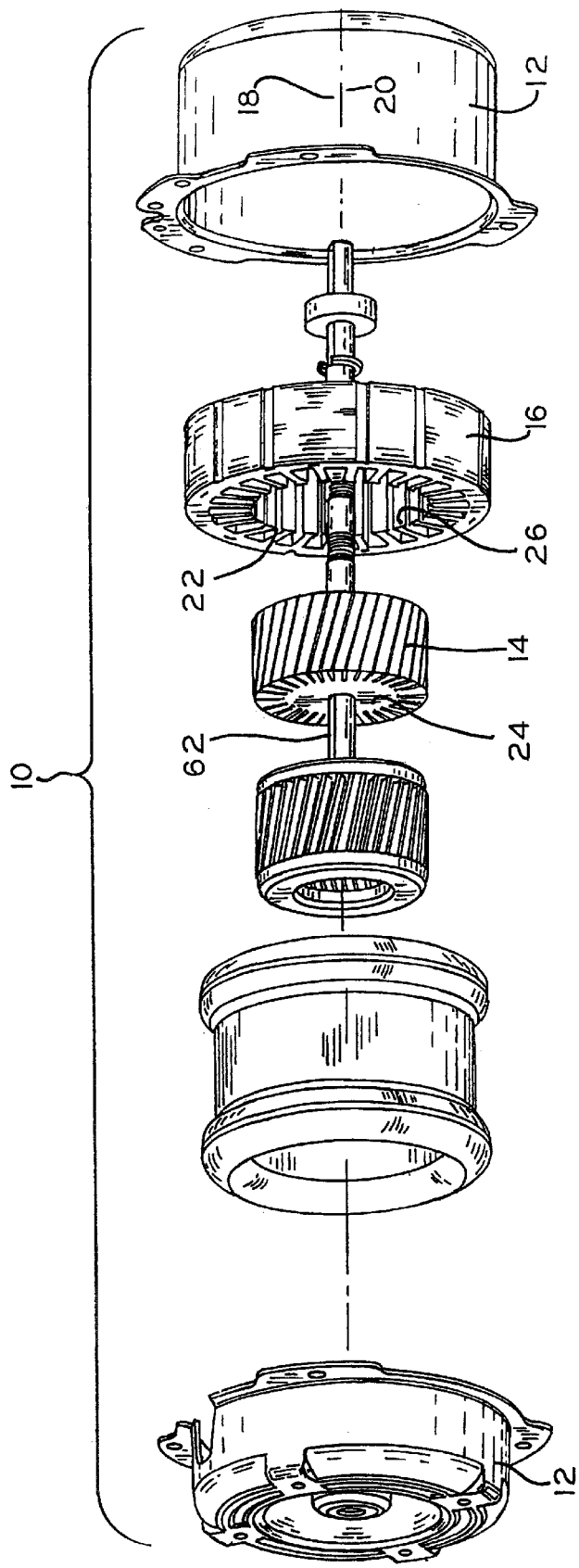
FIG_1

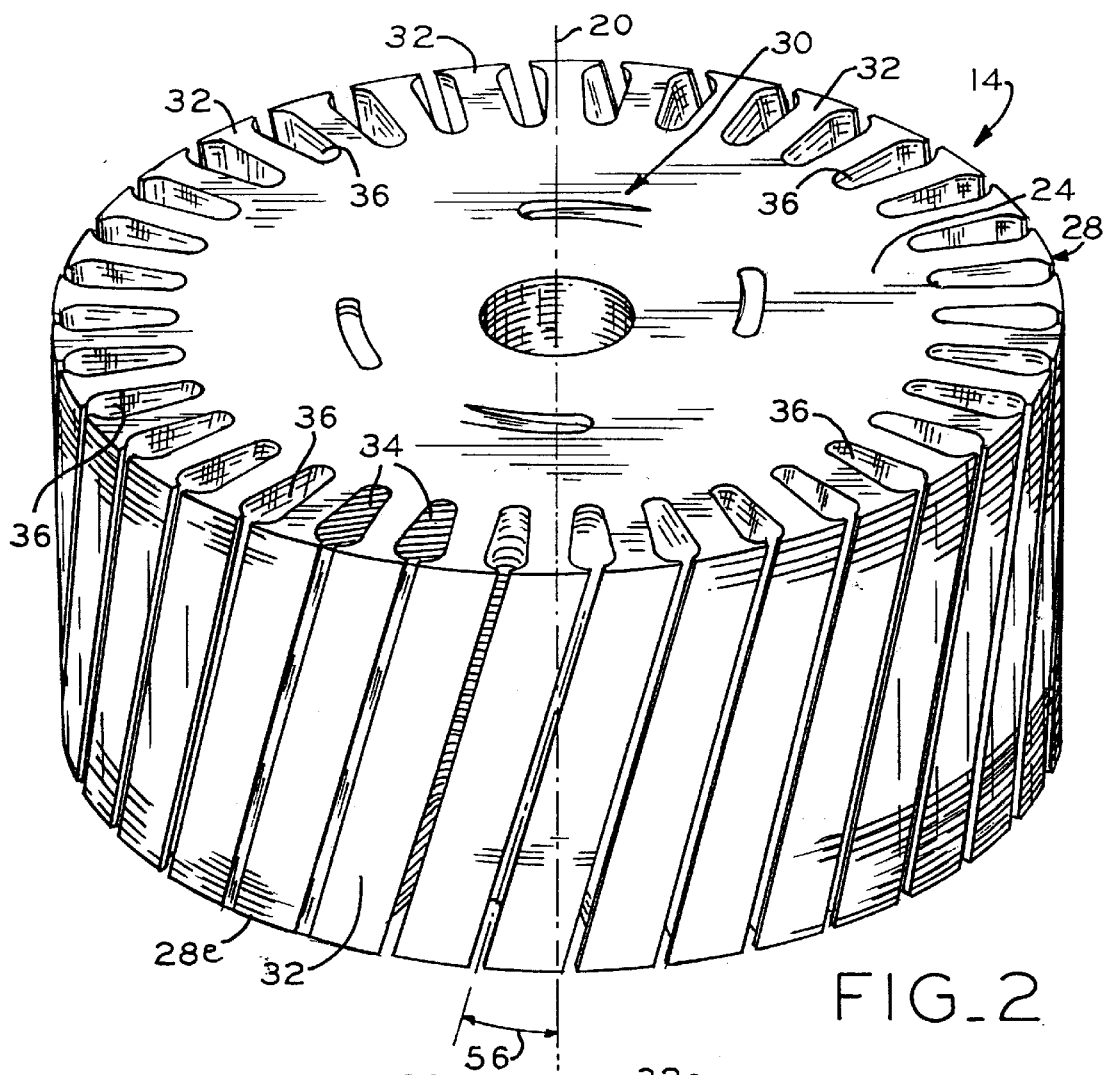
FIG_2
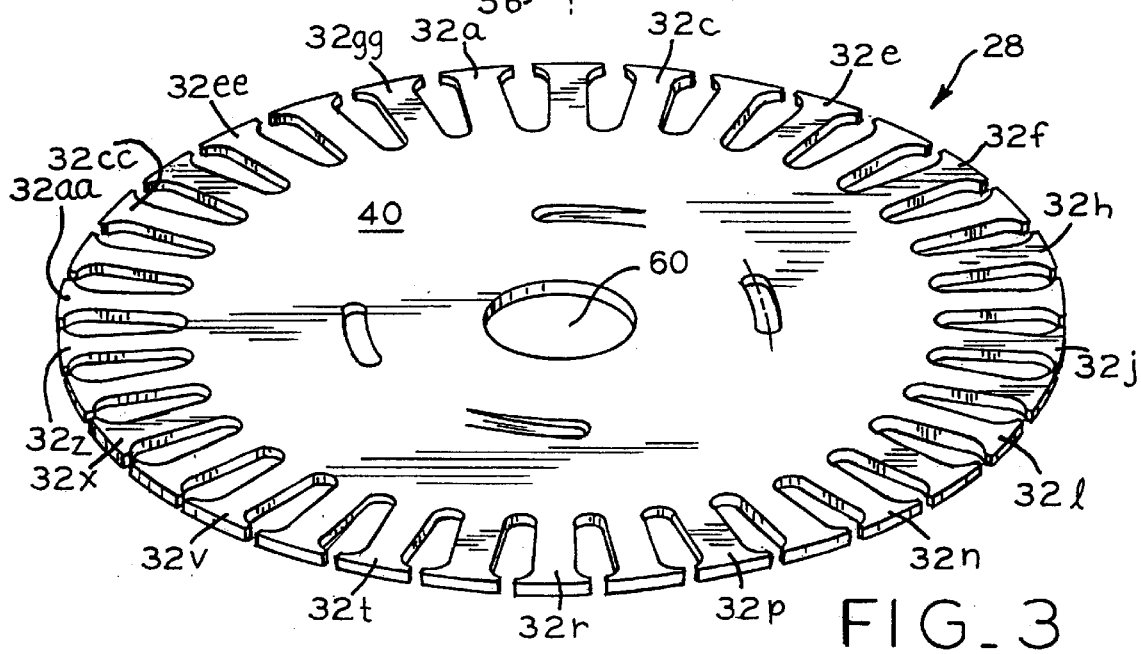
FIG_3

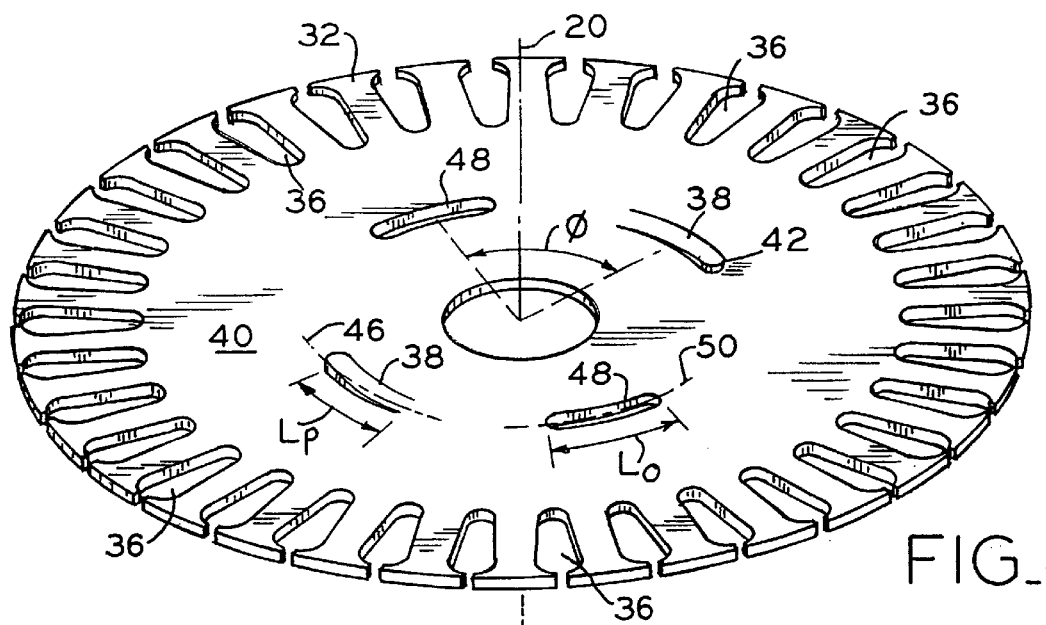
FIG_4
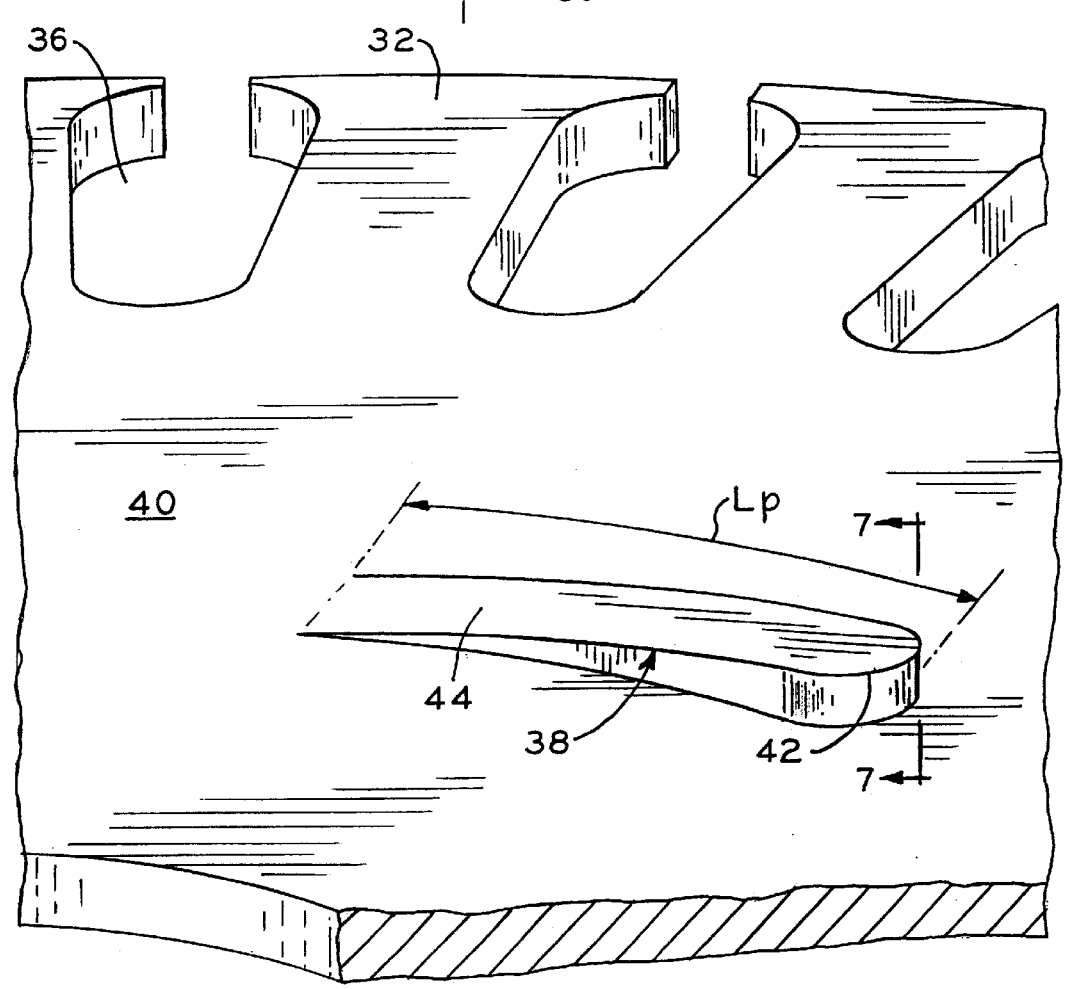
FIG_5

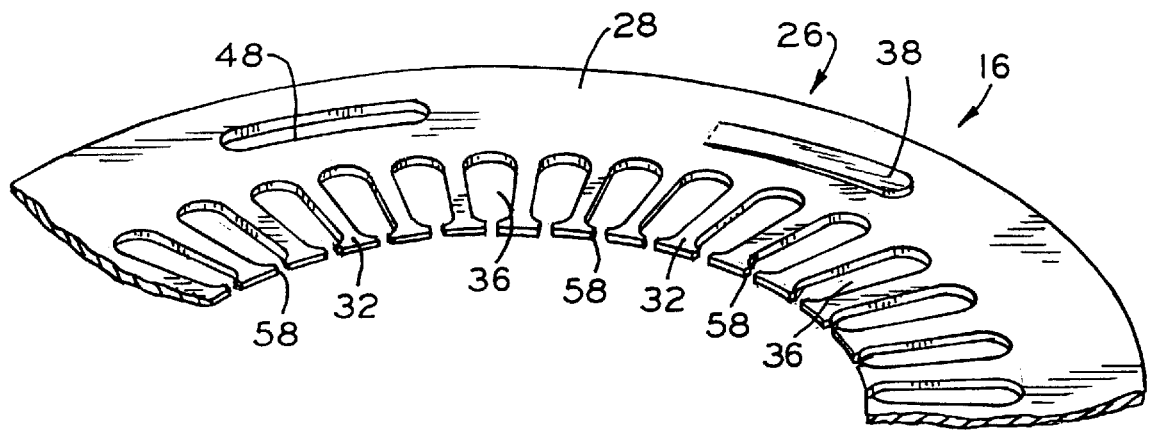
FIG_6
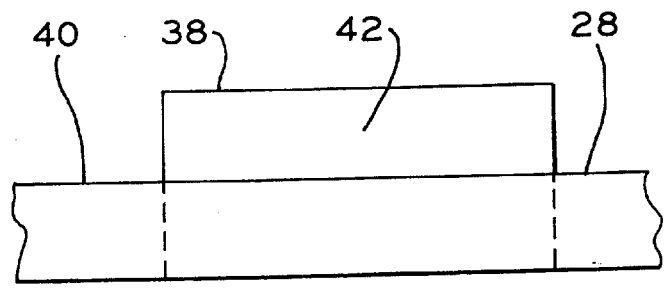
FIG_7

METHOD FOR FORMING MOTOR WITH ROTOR AND STATOR CORE PAIRED INTERLOCKS

CROSS-REFERENCE TO RELATED APPLICATIONS

This application is a divisional application of U.S. patent application Ser. No. 08/914,100 entitled Motor With Rotor And Stator Cored Paired Interlocks, filed Aug. 19, 1998, now U.S. Pat. No. 5,894,182.

FIELD OF THE INVENTION

The present invention relates generally to electric motors and more particularly to paired interlocks for motor rotor and stator cores that are formed from a stack of laminations, and a method for making such cores.

BACKGROUND OF THE INVENTION

Electrical motors are in vast use and impact every aspect of industrial, commercial and residential life. Such motors can vary from small, fractional motors that can be found, for example in washing machines and refrigerators, to large industrial applications for driving manufacturing equipment, fans and the like. Motors are commonly used to convert electrical energy into rotating energy or rotational force.

Typically, a motor includes a rotating central portion referred to as a rotor and a stationary outer portion referred to as a stator. The stator and rotor are housed in a housing that contains the motor. Both the rotor and stator contain electrical conducting elements. Rotor and stator cores can be formed with varying numbers of slots, which are the openings that receive the electrical conducting elements.

A rotor core is the central portion of the rotor that contains the conductive elements. The number of bars in rotor cores can vary considerably. In smaller, fractional squirrel-cage motors, for example, those having rotor diameters of about 2 inches, the number of bars is generally between 8 and 52. The core structure is typically formed as a plurality of stacked plates or laminations. The laminations, which can be metal, may be punched in a press, and subsequently stacked one on top of another to form the core. Because of the possible asymmetries in the lamination material, the laminations can be rotated so that the core, upon final assembly, forms a straight, rather than lopsided, stack. The laminations are interlocked with one another to form a rigid core structure, and to prevent the laminations from shifting relative to one another. Stator cores are formed in a like manner.

In one known interlocking arrangement, each lamination has a dimple or a recess punched into the surface, which forms a corresponding projection on the opposite side of the lamination. The laminations are then stacked one on top of the other with the projections from one lamination engaging and resting in the recess in the next adjacent lamination. In this nested arrangement, the laminations are kept in alignment with one another by engagement of the projections and recesses. This is a common and accepted method for interlocking laminations.

Although such known methods are in common practice, they do have their drawbacks. First, there is a mathematical dependency between the number of slots in the rotor or stator and the number of interlocks. Typically, the number of rotor slots and the number of interlocks are chosen such that they are both divisible by 3, 4 or 5, to yield rotations of 120, 90, and 72.5 degrees, respectively. Although this may be adequate when the rotor or stator has a quantity of slots that is readily divisible by such numbers, it is unacceptable when the number of slots in the rotor varies from such readily divisible numbers. For example, when the number of slots is 12, 15, 16, 20, 24, 28, 30, 32, 36, 40, 42, 45 or 48, the number of interlocks can be sufficient (e.g., between 3 and 4), and the rotational angles are readily determined by dividing the number of interlocks into 360 degrees.

As an example, a rotor having 12 slots can include 2, 3 or 6 interlocks, and will have rotational angles of 180, 120 and 60 degrees, respectively. It will however be readily apparent that when the number of bars varies from these readily divisible numbers, the incorporation of interlocks into a rotated core can become quite complex if not impossible. It follows that rotors having, for example, a prime number of bars (e.g., 13, 17, 19, 23, 29, 31, 37, 41, 43 or 47 bars) cannot be manufactured using the known method for interlocking laminations.

Moreover, it has been observed that rotor and stator cores having laminations having a quantity of slots that can only be rotated 180 degrees can be susceptible to forming a lopsided stack or core. That is, cores that include laminations that are rotated 180 degrees only, can produce an undesirable ovality in the finished core if an offset exists in punched holes that are intended to be concentric with one another.

Accordingly, there continues to be a need for a rotor and stator core lamination interlocking arrangement that is independent of the number of slots, which configuration accommodates lamination rotations, and further accommodates skewing of rotor core laminations relative to one another.

Additionally, there continues to be a need for a method for making such rotor and stator core laminations, which method does not increase, or preferably reduces the number of steps required in forming the core.

SUMMARY OF THE INVENTION

A method for making a core for one of a rotor and a stator for use in an electric motor, the core being formed from a plurality of laminations, includes the steps of forming a predetermined number of through-material slots in a first portion of a material stock and forming at least one angled interlocking projection in the material stock. The projection has a circumferential length and is formed so that at least a portion of the projection remains integral with the material stock and a portion of the projection extends transverse to said material stock.

The material stock is cut in at least one portion to define a receiving opening corresponding to the interlocking projection. The receiving opening has a circumferential length and is positioned relative to the projection at an angle $\phi$ that is a whole number multiple of $\beta$, where $\beta$ is an angle defined as a ratio of 360 degrees to the number of slots. The material stock is further cut to form a first substantially circular lamination.

Second and third laminations are formed in a like manner. The second lamination is rotated relative to said first lamination and is positioned on the first lamination such that the projection from the first lamination engages the receiving opening in the second lamination. The third lamination is rotated relative to the second lamination and is positioned on the second lamination such that the projection from the second lamination engages the receiving opening in the third lamination to form the core.

Other features and advantages of the invention will become apparent from the description that follows.

DESCRIPTION OF THE DRAWINGS

FIG. 1 is an exploded, perspective view of an exemplary motor, illustrating a rotor and stator each having a core formed in accordance with the principles of the present invention;

FIG. 2 is a perspective view of a rotor core formed from a stacked plurality of laminations including one embodiment of a paired interlocking system;

FIG. 3 is a perspective top view of one of the laminations of the core of FIG. 2;

FIG. 4 is a perspective bottom view of the lamination of FIG. 3;

FIG. 5 is an enlarged view of the lamination of FIG. 4, illustrating an interlocking projection;

FIG. 6 is an enlarged perspective view of a portion of an exemplary stator core having the paired interlocks;

FIG. 7 is a partial cross-sectional view taken along line 7—7 of FIG. 5;

DETAILED DESCRIPTION OF THE INVENTION

Figure 8:
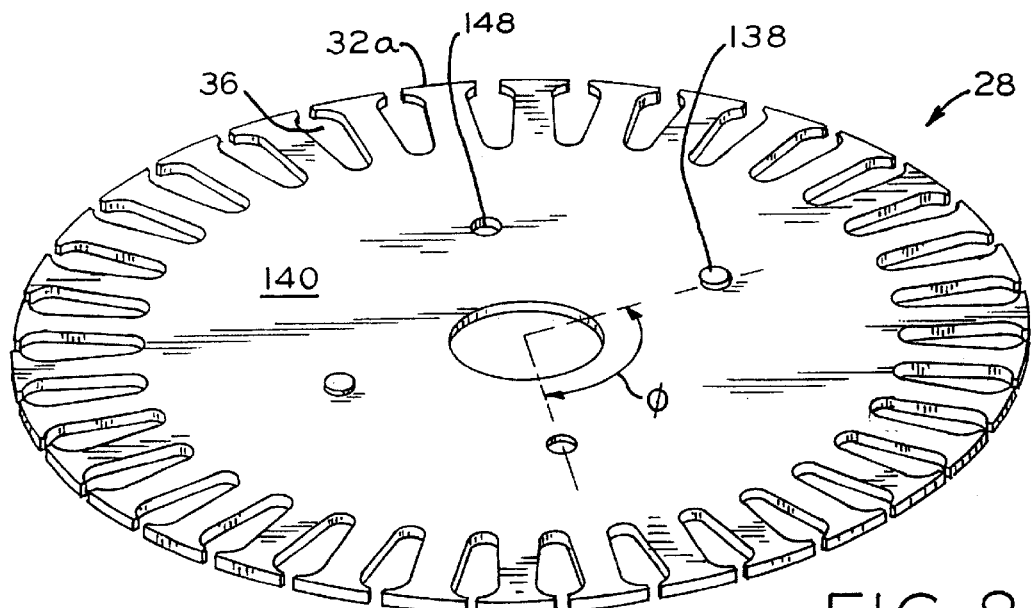
FIG. 8 is a partial perspective view of a lamination that includes an alternate embodiment of the paired interlock system.

While the present invention is susceptible of embodiment in various forms, there is shown in the drawings and it will hereinafter be described presently preferred embodiments and methods with the understanding that the present disclosure is to be consider an exemplification of the invention and is not intended to limit the invention to the specific embodiments illustrated and methods described.

Referring now to the figures and in particular to FIG. 1, there is shown a motor generally illustrated at 10. The motor 10 is enclosed within a housing 12 and includes a rotor 14 and a stator 16. The stator 16 is the stationary portion of the motor 10 that is mounted to and within the housing 12. The stator 16 defines a longitudinal axis, indicated at 18, therethrough. The rotor 16 is the rotating portion of the motor 10 that is positioned within the stator 16. The rotor 14 defines a longitudinal axis, indicated at 20, and is aligned with the stator 16 such that the axes 18, 20 of the rotor 14 and stator 16 are collinear.

The rotor 14 is positioned within the stator 16 to define a gap, referred to as an air gap, indicated at 22, therebetween. The gap 22 permits the rotor 14 to freely rotate within the stator 16 without the rotor 14 and stator 16 inadvertently contacting one another. In a typical, small, fractional motor, e.g., less than one horsepower, the gap 22 can be about ten thousandths of an inch (10 mils).

Those skilled in the art will recognize that the gap 22 between the rotor 14 and stator 16 must be maintained in order to prevent the rotor 14 and stator 16 from contacting one another as the rotor 14 rotates. Given that the rotor 14 can rotate at speeds exceeding 3600 revolutions per minute (RPM), such contact can damage both the rotor 14 and stator 16 thus rendering the motor 10 inoperable.

On the one hand, the gap 22 must be sufficiently small so that the electrical field that is created in the stator 16 can in turn induce an electrical field in the rotor 14. It is this induced electrical field in the rotor 14 that is converted to mechanical energy, and results in rotation of the rotor 14. On the other hand, the gap 22 must be sufficient to preclude contact between the rotor 14 and stator 16. As the gap 22 between the rotor 14 and stator 16 increases, the electrical field induced in the rotor 14 decreases.

Thus, the size of the gap 22 between the rotor 14 and stator 16 must be determined balancing the need to maintain critical space between the components while maintaining the components sufficiently close to reduce and preferably minimize field losses.

The rotor 14 and stator 16 each include a core 24, 26, respectively, that is formed of a plurality of plates or laminations 28 that are stacked together, one on another. For purposes of the present discussion, reference may be made to the rotor 14, rotor core 24, rotor laminations and the like. It is, however, to be understood that this discussion is equally applicable to stators 16 and stator components, and that such stators 16 and their components are within the scope of the present invention. The laminations 28 are secured in place relative to one another by an interlocking system 30. The interlocking system 30 prevents the laminations 28 from rotating and shifting relative to one another and from separating from each other, and thus maintains the rotor core 24 as a unitary member during manufacture.

As illustrated in FIG. 2, the core 24 includes a predetermined number of slots 36 formed therein at an edge or periphery of each lamination 28. The slots 36 are defined by teeth 32a–32gg that separate the slots 36 from one another. In a typical rotor core lamination 28, the teeth 32a–32gg are integral with the lamination central portion. The spaces between the teeth 32a–32gg, that is the slots 36, are configured to receive and secure the conducting elements 34 therebetween. In an exemplary, fractional motor 10, the conductors 34 are each formed as a single mass from, for example, aluminum that has been injected into the slots 36 in molten form. This type of rotor 14 manufacture is commonly referred to as a squirrel-cage motor.

In an exemplary stator 16, best seen in FIG. 6, the stator slots 36 extend outwardly from an inner edge of the stator laminations 28. Other than the opposing orientation, the stator 16 is formed in much the same manner as the rotor 14. It will be appreciated by those skilled in the art that the overall "circular" shape of the stator 16 is necessary only at an interior periphery, adjacent to the rotor 14.

The plates or laminations 28 are generally formed from sheet material, such as sheet steel, that has been stamped in the form of the laminations 28. The individual laminations 28 are then stacked, one on another, to form the core 24. As with much commercially available sheet material, the characteristics of the material, such as the thickness of the material, may not be uniform throughout the sheet. That is, the thickness of the material may vary. Although such a variance may not be critical for many applications, it can be critical for the manufacture of rotor and stator cores 24, 26, because the stacked core 24, 26 may exhibit asymmetries, e.g., lopsidedness, due to the varying lamination 28 thicknesses.

As provided above, the core 24 must be straight, that is, it must have a right-cylindrical form, so that the rotor 14 rotates within the stator 16 in a coaxial manner, without contacting the sides of the stator 16. It has been observed that an effective way to account for or accommodate the variation in lamination 28 thicknesses is to rotate the laminations 28 a predetermined number of degrees (e.g., 60, 90, 120) as they are formed to distribute the asymmetries about the entire 360 degrees of the core 24. This is referred to as "rotating" the core 24. The angle that the laminations 28 are rotated is referred to as the index angle, which includes the angle of rotation (or rotation angle) and any additional angle to account for skew.

In known core configurations, the rotation angle is dependent upon the number of interlocks and the number of slots in the core. For example, a core that has twenty-four slots can have two interlocks and an angle of rotation of 180 degrees (or a multiple thereof), three interlocks and an angle of rotation of 120 degrees (or a multiple thereof), or four interlocks and an angle of rotation of 90 degrees (or a multiple thereof). While this appears to provide sufficient flexibility in core design, it is to be noted that this configuration does not permit the manufacture of rotated cores that have a prime number (e.g., 13, 17, 19, 23, 29, 37, 41, 43 and 47) of bars. Moreover, as stated above, problems have been observed with laminations rotated 180 degrees only. For example, cores rotated only 180 degrees can exhibit an eccentricity which is an undesirable characteristic for a core. In addition, large rotational angles, e.g., 180 degrees, result in slower press speeds because of "communication" time between the manufacturing control system and the system servomotors and servo-drive systems.

The present invention uses an interlocking system 30 that permits the use of any number of interlocks in cores 24, 26 having any number of slots 36. Each interlock 30 includes a raised projection or tab 38 that is formed in a surface 40 of the lamination 28.

In a preferred embodiment, the projection 38 has a lead portion 42 and a trailing portion 44. The lead portion 42 can be stepped, as shown in FIG. 5. Essentially, the lead portion 42 is the uppermost raised portion from the surface 40 of the lamination 38. The trailing portion 44 can taper or ramp downwardly from the lead portion 42, sloping toward the surface 40 of the lamination 28. As best seen in FIG. 4, preferably, the projection 38 defines an arcuate shape along its circumferential length, as indicated by $L_p$, such that the centerline, as indicated at 46, remains at a fixed radial distance from the axis 20 of the lamination 38.

Unlike known interlocks which use a series of projections that lock or nest into one another in a fixed relation and at fixed positions, the projections 38 of the present invention are received in projection receiving openings or regions 48 that are formed in the lamination 28. The receiving regions 48 are elongated to receive the projections 38 along the length $L_o$ of the region and to thus permit the projection 38 to reside fully within the region 48. Similar to the projection 38, the receiving region 48 is preferably arcuate such that a centerline, indicated at 50, of the receiving region 48 is at a fixed radial distance from the lamination axis 20. In a preferred embodiment, the projections 38 and receiving regions 48 are paired with one another, and each receiving region 48 has a circumferential length $L_o$ that is somewhat longer than the length $L_p$ of its corresponding projection 38. As discussed more fully herein, the elongation of the receiving region 48 is adapted to accommodate a skew angle in, for example, the rotor core 24, if desired.

As is apparent from the figures, the centerlines of the projections and the receiving regions 46, 50 are at the same radial distance from the lamination axis 20. Thus, when in a stacked formation, the projection or projections 38 from one lamination 28 will reside wholly within the receiving region or regions 48 of an adjacent lamination 28.

Advantageously, the present interlocking configuration can be used to form rotor and stator cores 24, 26 having any number of slots 36, including a prime number of slots 36. Each receiving opening 48 and its corresponding projection 38 are separated from one another by an angle φ that is a multiple of an angle β that is defined by 360 degrees/S, where S is the number of slots 36 in the lamination 28. Expressed mathematically, the relationship is as follows:

$$\phi = n\beta,$$

and $$\beta = 360°/S,$$

where φ is the separation angle between the projection 38 and its corresponding receiving opening 48, n is a whole number integer, β is the base angle, and S is the number of slots 36.

For example, in a lamination 28 that has 36 slots 36, a projection 38 and its corresponding receiving region 48 are separated by an angle φ that is a multiple of 360 degrees/36, or 10 degrees. Thus, the projection 38 and its corresponding receiving region 48 can be separated by any multiple of 10 degrees, such as 20 degrees, 30 degrees and 40 degrees. Advantageously, any multiple of 10 degrees can be used. This provides extreme flexibility in rotor and stator core 24, 26 design. Likewise, in a lamination 28 that has 20 slots 36, the projections 38 and receiving regions 48 are separated by an angle φ that is a multiple of 360 degrees/20, or 18 degrees. Thus, the projection 38 and its corresponding receiving region 48 can be separated by any multiple of 18 degrees, such as 36 degrees, 54 degrees and 72 degrees. Any multiple of 18 degrees can be used. The rotational separation between each projection 38 and its corresponding receiving opening 48 must be constant for each lamination 28 of the core 24, 26.

The core 24, 26 that embodies the present interlocking configuration 30, can have any practical number of interlocks. Each lamination 28 can include a single projection 38 and receiving opening 48 or multiple projections 38 and receiving openings 48. It is, however, anticipated that for use in small motors 10, such as those having core 24 diameters less than about 2 inches, up to about nine interlock pairs, i.e., projections and corresponding receiving regions 38, 48 can be used. It will be apparent that as the size, i.e., diameter, of the motor 10 increases, the number of interlocks can increase. Such cores 24 can have any practical number of slots, including greater than about 59 and less than about seven slots.

It is also contemplated that laminations 28 can be formed that do not have equal numbers of projections 38 and receiving openings 48. That is, each lamination 28 in a set of laminations 28 for a core 24, 26 can include, for example, two projections 38 and four receiving openings 48. As stated above, in such a contemplated lamination 28 configuration, the projections 38 and openings 48 are separated from one another by an angle φ that is a multiple of an angle β that is defined as 360 degrees/S, where S is the number of slots 36.

Referring now to FIG. 2, the illustrated core 24 includes a skew, indicated at 56, in the slots 36. Those skilled in the art will recognize that such a skew 56 can be included to, for example, reduce torque loss in the motor 10 or to reduce motor 10 "noise". The skew 56 is effected by offsetting the laminations 28 from one another by a relatively small angle (lamination skew angle) relative to the angle of rotation. That is, the skew angle is relatively small compared to the angle that the laminations 28 are rotated relative to one another to account for lamination 28 asymmetries. Typically, the skew angle is equal to about 360 degrees/T, where T is the number of stator slots 58. For example, in a motor 10 having a stator 16 with 24 slots 58, the skew angle can be about 360 degrees/24 or 15 degrees. It will be appreciated by those skilled in the art that the lamination skew angle for each lamination 28 is the total skew angle divided by the total number of laminations 28 in the stator 16. Thus, for the exemplary stator 16 having a 15 degree skew angle, and having 30 laminations, the skew angle for each lamination is ½ degree.

The present interlocking system 30 facilitates providing such a skew angle in the rotor core 24 regardless of the number of slots 36 or the number of interlocks 30. As discussed above, the receiving regions 48 are somewhat longer circumferentially (as indicated at $L_o$) than their corresponding projections (indicted at $L_p$), to accommodate the slight offset to effect the core skew 56. Thus, adjacent laminations 28 can be positioned relative to one another, to accommodate both the angle of rotation and the smaller skew angle. Because the projections 38 can be received within the receiving regions 48 with a small amount of freedom for positioning, the skew angle can readily be accommodated between adjacent laminations 28. Thus, both skewed and non-skewed cores 24 can be fabricated using common rotor tooling and a common rotor design.

FIGS. 8 and 9a–9e illustrate various alternate embodiments of projections that can be formed having various shapes. Each of the projections is formed without the trailing portion as shown in the embodiment of the projection 38 in FIGS. 2–7.

Figures 9A, 9B, 9C:
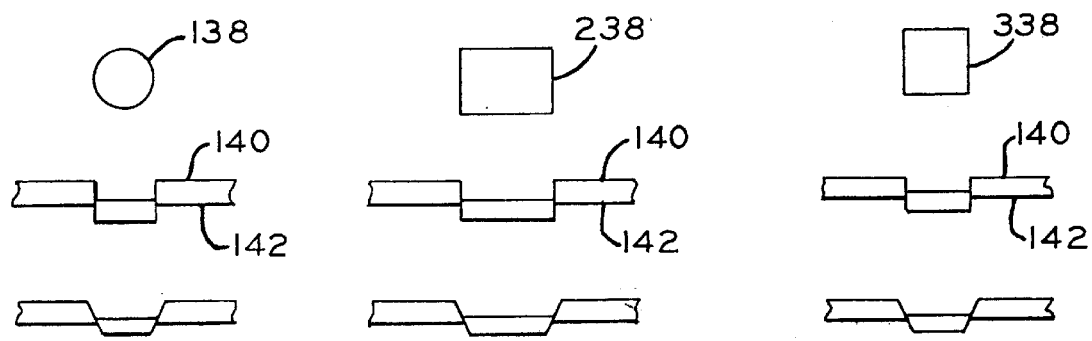
FIGS. 9a–9e illustrate various projection shapes of the embodiment of the interlock projections shown in FIG. 8.
Figures 9D, 9E:
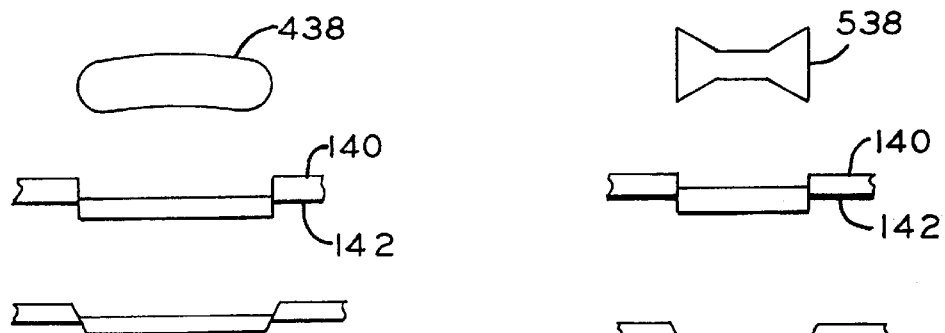

For example, as shown in FIGS. 8 and 9a, the projection 138 can have a circular shape. The corresponding receiving opening 148 in such an embodiment can have a like circular shape or, alternately, can be formed having an elongated arcuate shape (not shown) to permit a degree of freedom of positioning the projection 138 within the opening.

Other shapes, such as a square 238 (FIG. 9b), a rectangle 338 (FIG. 9c), an elongated projection 438 (FIG. 9d), and a double ended, opposingly oriented triangle or bow-tie 538 (FIG. 9e) can also be used. Each of these embodiments of the projection can be formed with a ramped trailing portion, or the projection can be formed as a fully downwardly extending tab. Likewise, the corresponding receiving openings can be formed having sufficient clearance or tolerance to permit a "tight" fit, or the openings can be configured to permit a degree of freedom for positioning the projection within the opening.

As is apparent from FIGS. 9a–9e, the projections 238, 338, 438, and 538 can be formed by "punching" one surface or side 140 of the lamination 28 which forms the respective projection on the other side or surface 142 of the lamination 28. The respective projections can be formed having square or straight sides, or the projections can be formed having ramped or angled sides as illustrated. All such shapes and their corresponding opening configurations are within the scope of the present invention.

Referring now to FIG. 2, it will be apparent that the end laminations 28e must be formed so that they engage or are engaged by only one adjacent lamination 28. That is, although the interior laminations 28 engage two adjacent laminations 28, the end laminations 28e engage or are engaged only by their respective interior lamination 28. In a preferred embodiment, the end lamination 28e is required only to receive the projections 38 from its adjacent lamination 28. This is readily accomplished by forming only receiving regions 48 in the lamination 28e. However, end laminations can be formed in a variety of configurations. For example, end laminations 28e can be formed with projections 38 and receiving regions 48, and the lamination 28 can be rotated transverse to its axis (so that the projections 38 are in an opposing orientation to those of the stack laminations 28). In this arrangement, the projections 38 extend into the adjacent lamination 28, and the receiving regions 48 receive the projections 38 from the adjacent lamination 28. Alternately, the end lamination 28e can be oriented relative to its adjacent lamination 28 so that the projections 38 are urged back into the body of the lamination 28.

As provided above, although the present interlocking system 30 has been, in part, described and illustrated with respect to a motor rotor core 24, the interlocking system 30 can be readily used to manufacture stator cores 26 as well as other cores that are formed as a stack of rotated laminations. Such application of the interlocking system 30 to such other cores is within the scope of the present invention.

Methods for making laminations 28 having the interlocking system 30, and for making rotor cores 24 and stators cores 26 that include laminations 28 having the interlocking projections 38 and receiving openings 48 are anticipated to be less costly, less time consuming and less tooling intensive than known core fabrication methods.

One contemplated method for forming, for example, rotor laminations 28 includes positioning a stock material, such as sheet steel, in a die-cutting apparatus. The stock material is centralized and the rotor slots 36 (e.g., conductor receiving regions) are cut, such as by punching. If desired, vent holes can be also be cut, as can pilot holes for aligning the work piece as it traverses through the apparatus.

The interlocking projections 38 are formed, such as by piercing or partial cutting through the stock material. Projection receiving regions 48 and a central bore 60 for a shaft 62 are also cut or punched. End laminations 28e are formed so as to engage or be engaged by only a single, adjacent lamination 28. In a preferred method, the end lamination 28e is formed by omitting the projection forming step. However, the receiving regions 48 and shaft bore 60 are formed in the material as are any other openings, penetrations or bores in the lamination 28. Other end lamination 28e forming steps may be used. For example, the end lamination 28e can be formed by rotating the end lamination 28e transversely about its axis (e.g., turned over) so that the projections 38 on the end lamination 28e are opposingly oriented relative to the other lamination 28 projections 38. Alternately, the projections 38 can be formed, such as by punching, in the opposing direction. End laminations can also be formed by punching all projections 38, rather than a combination of projections 38 and receiving regions 48.

The rotor lamination 28 is then cut from the stock material and staked for alignment. The lamination 28 is rotated a predetermined angle, i.e., the index angle, from the cut position. The index angle is selected to effect the rotated core. The index angle is equal to the angle of rotation if there is no skew, and is equal to the angle of rotation plus the lamination skew angle if a skew is so desired. The laminations 28 are subsequently stacked, one on another, to form the rotor core 24.

The stator laminations can be formed from the sheet material stock immediately adjacent and outward of the rotor formation after the rotor has been cut. Pilot holes are made in the material and, if it is so desired, the inner portion of the stator can be shaved to establish the space needed for the air gap. The stator slots are cut or pierced similar to the cutting of the rotor slots.

Interlocking projections are formed, such as by piercing or partial cutting through the stock material. Projections receiving regions are also cut or punched. The stator laminations are then cut from the stock material and staked for alignment. The laminations can be rotated a predetermined angle from the cut position to rotate the stator laminations. The laminations are then stacked, one on another to form the stator.

The remaining steps necessary for forming the motor, such as forming the electrical conducting elements and assembly of the components to fabricate the motor can be carried out using methods known by those skilled in the art.

From the foregoing it will be observed that numerous modifications and variations can be effectuated without departing from the true spirit and scope of the novel concepts of the present invention. It is to be understood that no limitation with respect to the specific embodiments illustrated or methods presented is intended or should be inferred. The disclosure is intended to cover by the appended claims all such modifications as fall within the scope of the claims.

What is claimed is:

1. A method for making a core for one of a rotor and a stator for use in an electric motor, the core being formed from a plurality of laminations comprising the steps of:

forming a predetermined number of through-material slots in a first portion of a material stock;

forming at least one angled interlocking projection in said material stock, said projection having a circumferential length and being formed so that at least a portion of said projection remains integral with said material stock and a portion of said projection extends transverse to said material stock;

cutting said material stock in at least one portion of said material stock to define a receiving opening corresponding to said interlocking projection, said receiving opening having a circumferential length and being positioned relative to said projection at an angle φ that is a whole number multiple of β, where β is an angle defined as a ratio of 360 degrees to the number of slots;

cutting said material stock to form a first substantially circular lamination;

forming at least one angled interlocking projection in a second portion of said material stock, said projection having a circumferential length and being formed so that at least a portion of said projection remains integral with said material stock and a portion of said projection extends transverse to said material stock;

cutting said material stock to define a receiving opening corresponding to said interlocking projection, said receiving opening having a circumferential length and being positioned relative to said projection at an angle φ that is a whole number multiple of β, where β is an angle defined as a ratio of 360 degrees to the number of slots;

cutting said material stock to form a second substantially circular lamination;

rotating said second lamination relative to said first lamination;

positioning said second lamination on said first lamination such that said projection from said first lamination engages said receiving opening in said second lamination to form said core;

forming at least one angled interlocking projection in a third portion of said material stock, said projection having a circumferential length and being formed so that at least a portion of said projection remains integral with said material stock and a portion of said projection extends transverse to said material stock;

cutting said material stock to define a receiving opening corresponding to said interlocking projection, said receiving opening having a circumferential length and being positioned relative to said projection at an angle φ that is a whole number multiple of β, where β is an angle defined as a ratio of 360 degrees to the number of slots;

cutting said material stock to form a third substantially circular lamination;

rotating said third lamination relative to said second lamination; and positioning said third lamination on said second lamination such that said projection from said second lamination engages said receiving opening in said third lamination to form said core.

2. The method in accordance with claim 1 including the step of forming a plurality of interlocking projections in each said lamination and forming at least one receiving opening corresponding to each said projection, said projections and said corresponding receiving openings being positioned relative to one another at an angle φ that is a whole number multiple of β, where β is an angle defined as a ratio of 360° to the number of rotor slots.

3. The method in accordance with claim 1 including the step of forming an end lamination and interlocking said end lamination with one lamination adjacent thereto.

4. The method in accordance with claim 3 wherein said end lamination is formed with only receiving openings.

5. The method in accordance with claim 3 wherein said end lamination is formed by the step of rotating said end lamination transversely about an axis to orient its respective projections in opposing relation to projections of an adjacent lamination.

6. A method for making a core for use as one of a rotor and a stator for an electric motor, the core being formed from a plurality of laminations, comprising the steps of:

providing a material stock;

forming a first lamination by the steps of a) defining an axis perpendicular to a plane of the material stock;

b) forming a predetermined number of through-material slots in the material stock;

c) forming an interlocking projection in the material stock, said projection extending transverse from a plane of the material stock and having a circumferential length, said projection being formed a predetermined distance from said axis;

d) cutting said material stock to form a receiving opening in said material stock corresponding to said interlocking projection, said receiving opening having a circumferential length larger than the circumferential length of said projection and being formed in the material stock at a distance equal to the predetermined distance at which the projection is formed, said receiving opening being formed at an angle φ relative to the projection, wherein φ is a whole number multiple of β, and wherein β is an angle defined as a ratio of 360 degrees to the number of through material slots;

e) cutting said material stock to form a substantially circular lamination forming a second lamination by carrying out steps a) though e);

rotating said second lamination relative to said first lamination;

positioning said second lamination on said first lamination such that said projection from said first lamination engages said receiving opening in said second lamination;

forming a third lamination by carrying out steps a) though e);

rotating said third lamination relative to said second lamination; and positioning said third lamination on said second lamination such that said projection from said second lamination engages said receiving opening in said first lamination to form said core.

7. The method for making a core in accordance with claim 6 including the step of forming a plurality of locking projections in each said lamination and at least one receiving opening corresponding to each said interlocking projection.

8. The method for making a core in accordance with claim 6 including the step of forming an end lamination and interlocking said end lamination with a lamination adjacent thereto.

9. The method for making a core in accordance with claim 8 wherein said end lamination is formed having only receiving openings.

* * * * *